United States Patent
Ye et al.

(10) Patent No.: US 8,279,633 B2
(45) Date of Patent: Oct. 2, 2012

(54) PARALLEL-CONNECTED RESONANT CONVERTER CIRCUIT AND CONTROLLING METHOD THEREOF

(75) Inventors: Haoyi Ye, Shanghai (CN); Jianhong Zeng, Shanghai (CN); Hongyang Wu, Shanghai (CN); Chao Yan, Shanghai (CN); Teng Liu, Shanghai (CN); Jianping Ying, Shanghai (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 0 days.

(21) Appl. No.: 13/090,925

(22) Filed: Apr. 20, 2011

(65) Prior Publication Data

US 2011/0267845 A1   Nov. 3, 2011

Related U.S. Application Data

(63) Continuation of application No. 12/394,571, filed on Feb. 27, 2009, now abandoned.

(30) Foreign Application Priority Data

Mar. 14, 2008  (TW) .............................. 97109222 A

(51) Int. Cl.
*H02M 3/335* (2006.01)
(52) U.S. Cl. ................................ 363/21.02; 363/21.03
(58) Field of Classification Search ................ 363/15, 363/16, 21.02, 21.03, 65, 71, 95, 97, 131
See application file for complete search history.

(56) References Cited

U.S. PATENT DOCUMENTS

| | | | |
|---|---|---|---|
| 2004/0012985 A1* | 1/2004 | Ribarich | 363/21.02 |
| 2005/0024894 A1* | 2/2005 | Liu et al. | 363/15 |
| 2007/0159862 A1* | 7/2007 | Vinciarelli | 363/65 |
| 2008/0285312 A1* | 11/2008 | Fu et al. | 363/21.06 |

\* cited by examiner

*Primary Examiner* — Nguyen Tran
(74) *Attorney, Agent, or Firm* — Morris, Manning & Martin, LLP; Tim Tingkang Xia, Esq.

(57) ABSTRACT

The configurations of a parallel-connected resonant converter circuit and a controlling method thereof are provided in the present invention. The proposed circuit includes a plurality of resonant converters, each of which has two input terminals and two output terminals, wherein all the two input terminals of the plurality of resonant converters are electrically series-connected, and all the two output terminals of the plurality of resonant converters are electrically parallel-connected.

9 Claims, 7 Drawing Sheets

PARALLEL-CONNECTED RESONANT CONVERTER CIRCUIT AND CONTROLLING METHOD THEREOF

CROSS REFERENCE TO RELATED APPLICATIONS

This application is a continuation of U.S. patent application Ser. No. 12/394,571 filed on Feb. 27, 2009 now abandoned; the entirety of which is incorporated herein by reference.

FIELD OF THE INVENTION

The present invention relates to a parallel-connected resonant DC/DC converter circuit and a controlling method thereof, which can be employed to realize a current balance among converters when the switching frequencies of all the converters are the same.

BACKGROUND OF THE INVENTION

The developing trend of the DC/DC converter is just like that of the most of the power supply products, that is—high efficiency. The resonant DC/DC converter is easier to realize the high efficiency due to its feature of soft-switching. However, there are still certain existing drawbacks regarding the resonant DC/DC converter, e.g., the high ac current of the output filter of the series resonant DC/DC converter resulting in the high power loss and the large volume of the output filter.

FIGS. 1(a)-1(d) are schematic circuit diagrams of several kinds of resonant DC/DC converter circuit. FIG. 1(a) shows a series resonant converter which includes a DC power source providing an input voltage Vin, a first and a second switches S1-S2, a resonant capacitor Cs and an output capacitor Co wherein the output voltage Vo can be gotten on it, an inductor Ls, a transformer T, diodes D1-D2 and load Ro. The differences between FIG. 1(b) and FIG. 1(a) are that a capacitor Cp is parallel-connected to the primary side of the transformer T; the resonant capacitor Cs is omitted; and an inductor Lr among the secondary side of the transformer T, the diode D1 and the output capacitor Co is added. FIG. 1(c) shows a parallel resonant converter, e.g. an LCC resonant converter and the difference between FIG. 1(c) and FIG. 1(b) is that the resonant capacitor Cs connected in series with the inductor Ls is added. The difference between FIG. 1(d) and FIG. 1(a) is that a magnetizing inductor Lm is parallel-connected to the primary side of the transformer T. Taking the example of the LLC series resonant DC/DC converter as shown in FIG. 1(d), the operating waveforms are shown in FIG. 2. S1 and S2 indicates the driving signals of the switches S1-S2 respectively; $i_s$ and $i_m$ are currents flowing through the resonant inductor Ls and the magnetizing inductor Lm respectively; $i_m$ has the values of $I_m$ and $-I_m$ respectively when switches S1 and S2 are turned off; Vds 1 is the voltage between the drain and the source of the switch S1; $i_{D1}$ and $i_{D2}$ are current waveforms of the output rectifying diodes D1 and D2; Io is the output current of the converter; $i_{D1}+i_{D2}$–Io is the current flowing through the output filter (output capacitor) Co; Vcs is the voltage across capacitor Cs; and all the waveforms in FIG. 2 operate in six intervals (t0-t1, t1-t2, ... and t5-t6) per period, and iterate from the seventh interval (t6=t0). And since $i_{D1}$ and $i_{D2}$ have larger ripples, the ac current value of the output filter (output capacitor) Co is large which results in large size of Co and high power loss of the converter.

To decrease the ac current of the output filter (output capacitor) Co, the interleaved method is always used to control the resonant converters, wherein the interleaved method means that at least two converters operate at substantially the same frequency and with some phase φ (0°<φ<360°) shifted between them. However, some problems still exist due to the characteristics of the resonant converters.

When the interleaved control method is adopted, the resonant converters operating at the substantially the same frequency and with some phase shifted between them are always connected in parallel at a common output filter and their input terminals are all connected together. Thus the ac current of the output filter (e.g. the output capacitor) Co is cancelled and the effect of the cancellation is the function of the shifted phase φ so that the size of the output filter (output capacitor) Co is decreased. The interleaved control method is widely used in PWM converters since they operate at constant frequency and could regulate the output voltage and the current through changing the duty ratio such that the current balance between the interleaved PWM converters is easy to be realized. While in a resonant converter, the regulations of the output voltage and the current are realized through changing the frequency. If the resonant converters are forced to operate in the same frequency, the current balance between the interleaved resonant converters is hard to be realized due to their different characteristics. On the contrary, if each converter regulates the voltage and the current on its own so as to realize the current balance, they could not operate at the same switching frequency so as to lose the advantage of the controlling method for the interleaved and parallel-connected configuration.

Keeping the drawbacks of the prior arts in mind, and employing experiments and research full-heartily and persistently, the applicant finally conceived a parallel-connected resonant DC/DC converter circuit and a controlling method thereof.

SUMMARY OF THE INVENTION

It is therefore an object of the present invention to provide a parallel-connected resonant DC/DC converter circuit and a controlling method thereof, which can be employed to realize a current balance among converters when the switching frequencies of all the converters are the same.

According to the first aspect of the present invention, a parallel-connected resonant converter circuit includes a plurality of resonant converters, each of which has two input terminals and two output terminals, wherein all the two input terminals of the plurality of resonant converters are electrically series-connected, and all the two output terminals of the plurality of resonant converters are electrically parallel-connected.

Preferably, the circuit further includes a DC power source having a positive and a negative terminals, an output capacitor, and a plurality of input capacitors, each of the plurality of input capacitors has a first and a second terminals and is electrically parallel-connected to the two input terminals of a corresponding one of the plurality of resonant converters, wherein the output capacitor is electrically parallel-connected to the two output terminals of each the resonant converter, and the series-connected resonant converters are connected in paralleled with the DC power source at the positive and the negative terminals.

Preferably, each the resonant converter is one of a series resonant DC/DC converter and a parallel resonant DC/DC converter.

Preferably, the series resonant DC/DC converter is an LLC series resonant DC/DC converter.

Preferably, the parallel resonant DC/DC converter is an LCC parallel resonant DC/DC converter.

Preferably, the plurality of resonant converters are operating at substantially the same frequency.

Preferably, the plurality of resonant converters are operating under an interleaved mode.

According to the second aspect of the present invention, a parallel-connected resonant converter circuit includes a first resonant converter having two input terminals and two output terminals, a second resonant converter having two input terminals and two output terminals, wherein the two input terminals of the second resonant converter are electrically series-connected with the two input terminals of the first resonant converter, and the two output terminals of the second resonant converter are electrically parallel-connected with the two output terminals of the first resonant converter.

Preferably, the circuit further includes a DC power source having a positive and a negative terminals, an output capacitor and a first and a second input capacitors, wherein the first and the second input capacitors are electrically parallel-connected with the two input terminals of the first and the second resonant converters respectively, the output capacitor is electrically parallel-connected with the two output terminals of the first and the second resonant converters, each of the first and the second input capacitors has a first and a second terminals, the first terminal of the first input capacitor is coupled to the positive terminal, the second terminal of the first input capacitor is coupled to the first terminal of the second input capacitor, and the second terminal of the second input capacitor is coupled to the negative terminal.

Preferably, the first and the second resonant converters are operating under an interleaved mode.

Preferably, each of the first and the second resonant converters is an LLC series resonant DC/DC converter.

Preferably, the first and the second resonant converters operate with 90° phase shifted.

Preferably, the first and the second resonant converters are operating at substantially the same frequency.

According to the third aspect of the present invention, a controlling method for a parallel-connected resonant converter circuit, wherein the circuit includes a plurality of resonant converters, each of which has two input terminals and two output terminals, all the two input terminals of the plurality of resonant converters are electrically series-connected, and all the two output terminals of the plurality of resonant converters are electrically parallel-connected, includes steps of: (a) causing an input current flowing through the two input terminals of a specific one of the plurality of resonant converters to rise when an output current flowing through the two output terminals of the specific resonant converter rises; (b) causing an input voltage across the two input terminals of the specific resonant converter to decrease when the input current flowing through the two input terminals of the specific resonant converter rises; (c) causing an input voltage across the two input terminals of at least one of the remaining ones of the plurality of resonant converters to rise when the input voltage across the two input terminals of the specific resonant converter decreases; (d) causing an output current flowing through the two output terminals of at least one of the remaining resonant converter to rise when the input voltage across the two input terminals of at least one of the remaining resonant converter rises; and (e) reaching the balance between the specific resonant converter and at least one of the remaining of resonant converters when a ratio between the output current flowing through the two output terminals of the specific resonant converter and the output current flowing through the at least one of the remaining resonant converters equals to a ratio between a reciprocal of a DC voltage gain of the specific resonant converter and a reciprocal of a DC voltage gain of the at least one of the remaining resonant converter.

Preferably, the plurality of resonant converters includes a first and a second resonant converters, the specific resonant converter is the first resonant converter and the remaining one is the second resonant converter.

Preferably, the plurality of resonant converters are operating under an interleaved mode.

Preferably, the plurality of resonant converters are operating at substantially the same frequency.

The present invention may best be understood through the following descriptions with reference to the accompanying drawings, in which:

DETAILED DESCRIPTION OF THE PREFERRED EMBODIMENT

Figure 1A:
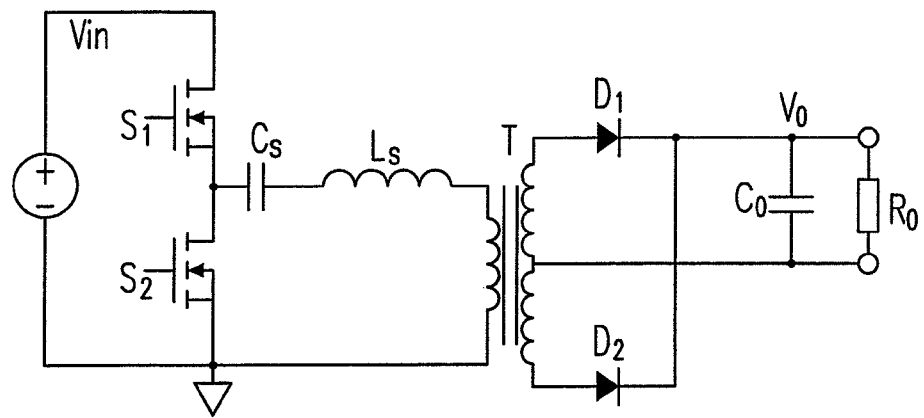
FIG. 1(a) shows a circuit diagram of a series resonant DC/DC converter in the prior art.
Figure 1B:
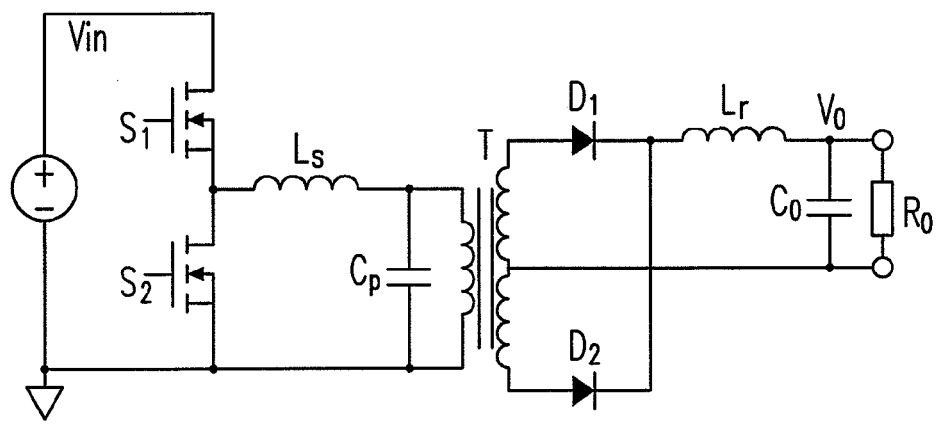
FIG. 1(b) shows a circuit diagram of a parallel resonant DC/DC converter in the prior art.
Figure 1C:
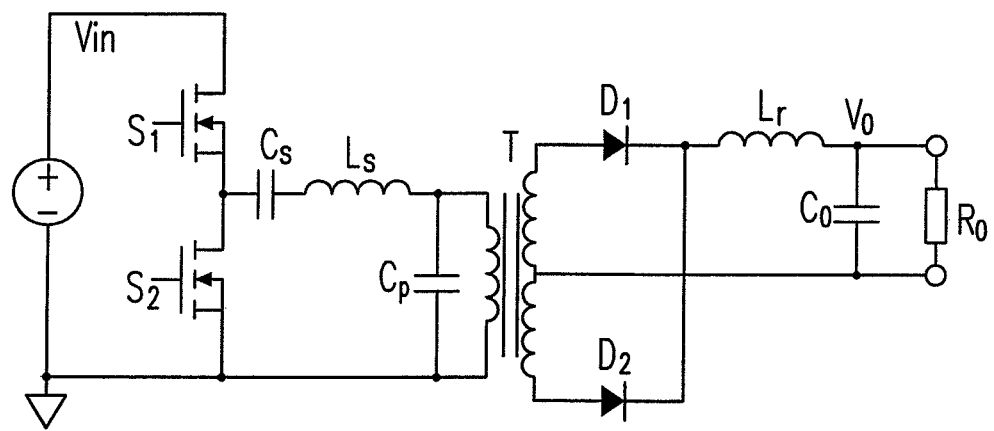
FIG. 1(c) shows a circuit diagram of an LCC parallel resonant DC/DC converter in the prior art.
Figure 1D:
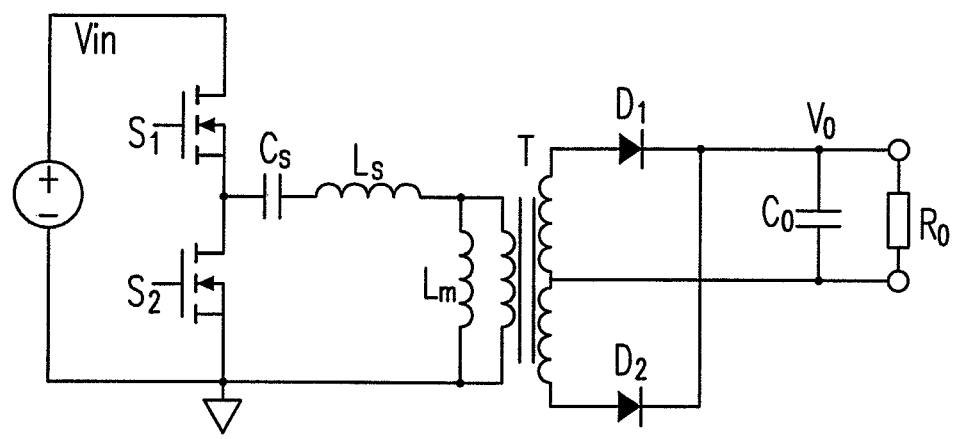
FIG. 1(d) shows a circuit diagram of an LLC series resonant DC/DC converter in the prior art.
Figure 2:
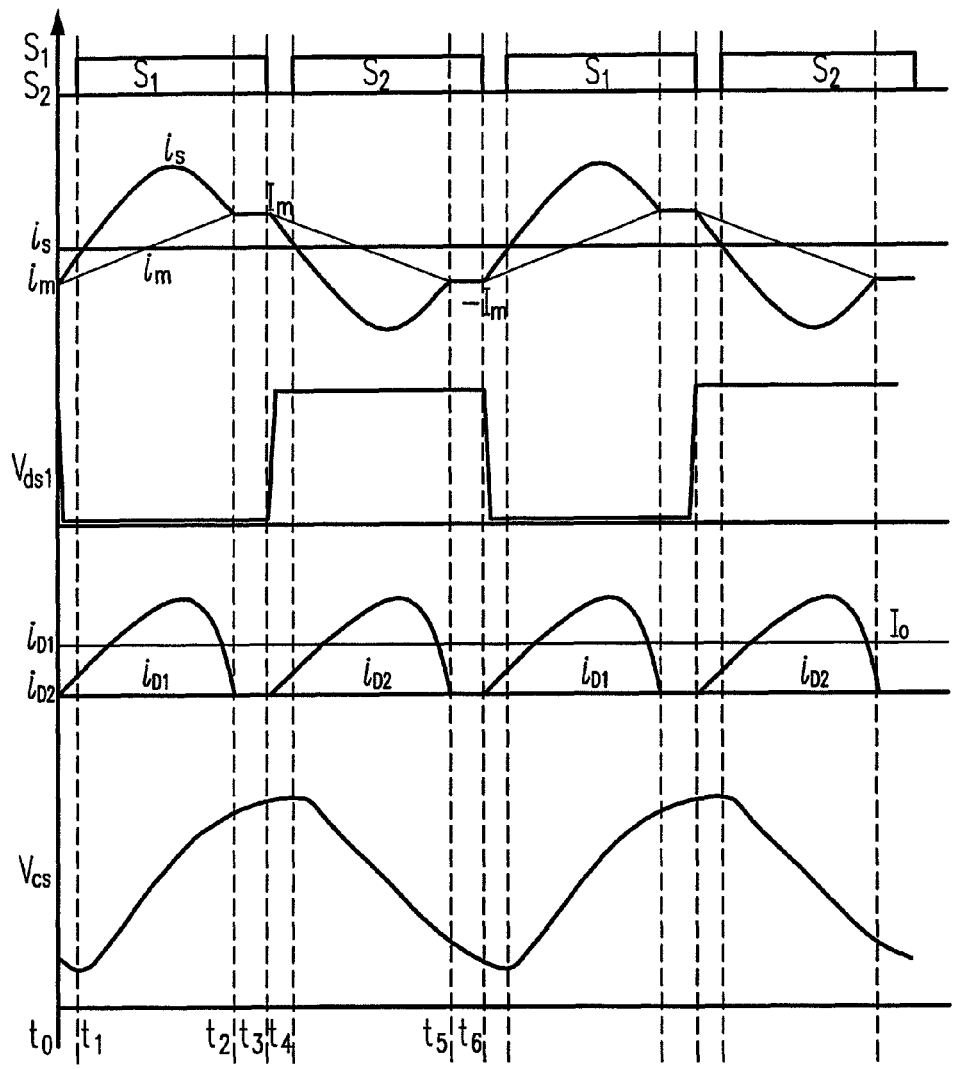
FIG. 2 shows operating waveforms of an LLC series resonant DC/DC converter in the prior art.
Figure 3:
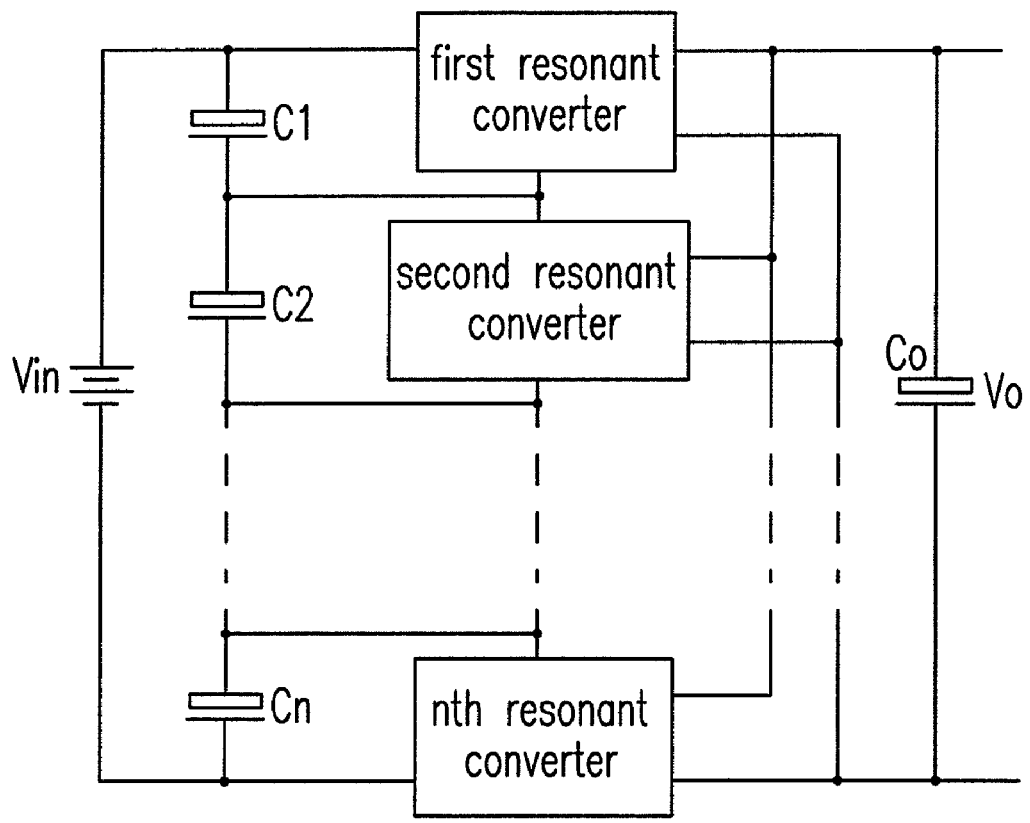
FIG. 3 shows a schematic circuit diagram of a circuit having N interleaved and parallel-connected resonant converters according to the first preferred embodiment of the present invention.

As shown in FIG. 3, it is a schematic circuit diagram of a circuit having N parallel-connected resonant converters operating in interleaved mode according to the first preferred embodiment of the present invention. In which, it includes a DC power source, input capacitors C1-Cn, a first to a nth resonant converters and an output capacitor Co providing an output voltage. All the DC inputs of the DC/DC resonant converters are series-connected, all the outputs of the DC/DC resonant converters are parallel-connected, and the switching frequencies of all the converters are substantially the same.

Figure 4:
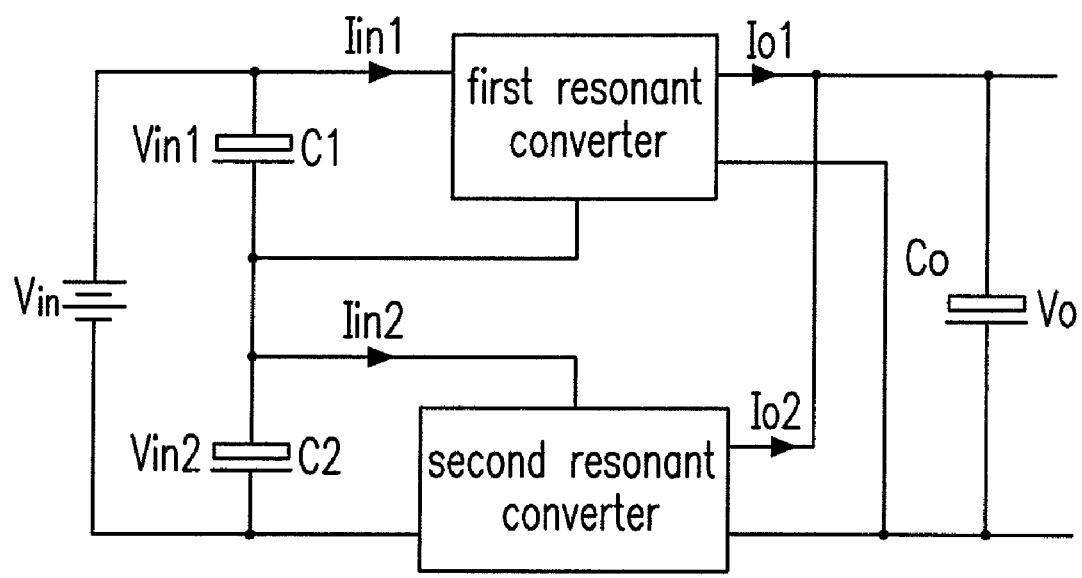
FIG. 4 shows a schematic circuit diagram of a circuit having two interleaved and parallel-connected resonant converters according to the second preferred embodiment of the present invention.

Taking the example of two parallel-connected resonant converters as shown in FIG. 4, it includes a DC power source Vin, a first and a second resonant converters, a first and a second input capacitors C1-C2, and an output capacitor Co providing an output voltage Vo.

Vin1 and Vin2 indicate the input voltages of the first and the second resonant converters respectively; Iin1 and Iin2 are the DC components of the input current of the first and the second resonant converters respectively; and Io1 and Io2 are the DC components of the output currents of the first and the second resonant converters respectively. Assuming that M1 and M2 are the DC voltage gains of the first and the second resonant converters respectively, i.e. M1=Vo/Vin1 and M2=Vo/Vin2, then Io1=Iin1/M1 and Io2=Iin2/M2 under a stable status according to the energy conservation law. Due to that the inputs of the first and the second resonant converters are series-connected, Iin1=Iin2 under the stable status, thus Io1/Io2=M2/M1=Vin1/Vin2.

If the first and the second resonant converters belong to the same type and have the same design parameters, the two resonant converters still may have different gains under the same frequency due to the discrepancies of the actual value of their elements such that the output currents are different. And the difference between the two output currents is determined by the difference between the gains of the two resonant converters.

If the parallel-connected first and second resonant converters belong to the same type but have different design parameters, or the first and the second resonant converters belong to the different types, e.g., the first resonant converter is a series resonant converter while the second resonant converter is a parallel resonant converter, then the gains of the first and the second resonant converters under the same frequency may be different, and the output currents are different. The difference between the two output currents is determined by the difference between the gains of the first and the second resonant converters. The input voltages of the first and the second resonant converters Vin1 and Vin2 are proportional to their gains since their outputs are parallel-connected.

No matter what kind of aforementioned parallel-connections is employed, if an external disturbance causes Io1/Io2>M2/M1 at a specific moment under a dynamic status, that is to say the current of Io1 is increased, which results in Iin1>Iin2 such that Vin1 decreases, and Vin2 increases so as to force Io2 to rise until Io1/Io2=M2/M1, thus a balance point is reached again. Thus, this circuit has the capability of automatically balancing the output currents of the first and the second resonant converters.

FIG. 4 is a schematic circuit diagram of a circuit having two parallel-connected resonant converters operating in interleaved mode according to the second preferred embodiment of the present invention. In FIG. 4, since the two parallel-connected resonant converters operate in interleaved mode which means they operate at substantially the same switching frequency and with some phase shifted between them and the ac current of the output filter (output capacitor) Co is reduced, the loss of the converter is decreased and the volume of the output filter (output capacitor) Co is reduced. The difference between the output currents of the first and the second resonant converters is determined by the difference between the gains of the first and the second resonant converters, and the balance point under the dynamic status can be reached automatically.

Similarly, in the circuit of FIG. 3, the parallel-connected resonant converters could operate in interleaved mode with the same switching frequency such that the power loss of the converters is decreased and the volume of the output filter (output capacitor) Co is also reduced. The difference between output currents of any two resonant converters is determined by the difference between the gains of those two resonant converters, and a balance point can be reached under the dynamic status automatically.

Figure 5:
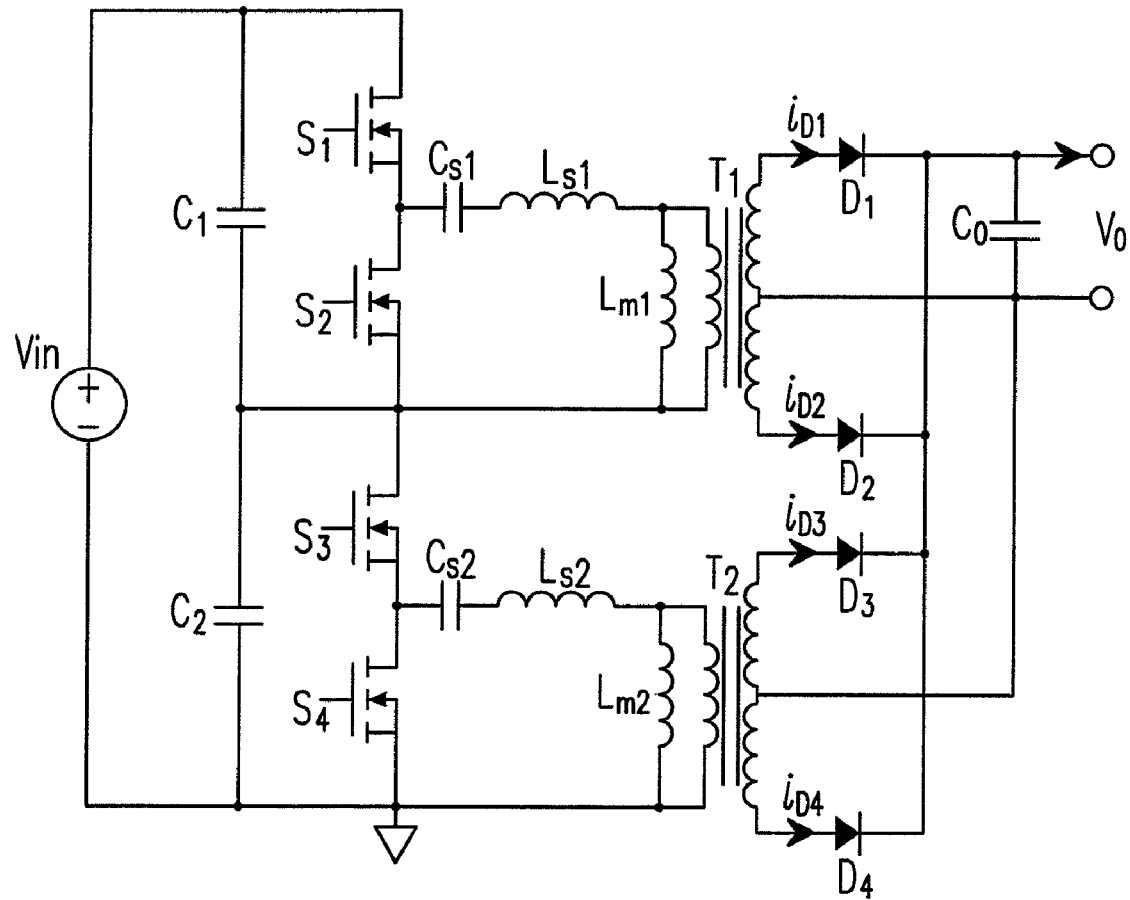
FIG. 5 shows a circuit diagram of a circuit having two interleaved and parallel-connected resonant converters according to the second preferred embodiment of the present invention.
Figure 6:
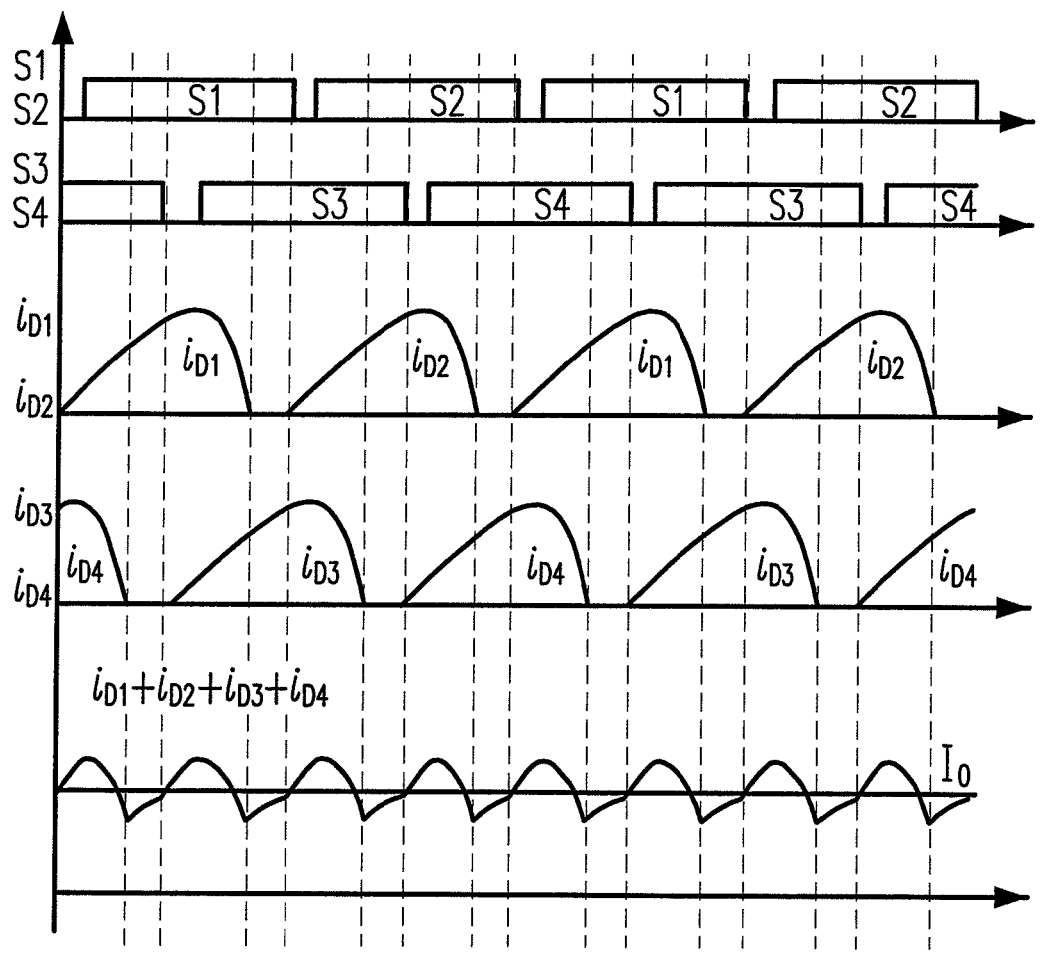
FIG. 6 shows operating waveforms of a circuit having two interleaved and parallel-connected resonant converters according to the second preferred embodiment of the present invention.

FIG. 5 is a circuit diagram of a circuit having two parallel-connected LLC series resonant DC/DC converters operating in interleaved mode with the shifted phase, e.g., 90° between them according to the second preferred embodiment of the present invention. It includes a DC power source providing an input voltage Vin, a first to a fourth switches S1-S4, input capacitors C1-C2, resonant capacitors Cs1-Cs2 and a common output capacitor Co, inductors Ls1-Ls2, Lm1-Lm2, transformers T1-T2 and diodes D1-D4, and provides an output voltage Vo. FIG. 6 shows the corresponding operating waveforms of the circuit shown in FIG. 5. S1, S2, S3 and S4 indicate driving signals of switches S1-S4 respectively; $i_{D1}$, $i_{D2}$, $i_{D3}$ and $i_{D4}$ are the current waveforms of the rectifying diodes D1, D2, D3 and D4 respectively; Io is the DC component of the total output current; $i_{D1}+i_{D2}+i_{D3}+i_{D4}-Io$ is the AC current flowing through the output filter (output capacitor) Co. Observing from FIG. 6, the AC current flowing through the output filter (output capacitor) Co of the parallel-connected LLC series resonant DC/DC converters is dramatically decreased so that the volume of the output filter (output capacitor) Co is also decreased. The shifted phase between the two LLC series resonant DC/DC converters may be other degree between 0° and 360°, and the cancellation effect of the AC current flowing through the output filter varies according to the shifted phase.

According to the aforementioned descriptions, the present invention provides a parallel-connected resonant DC/DC converter circuit and a controlling method thereof, which can be employed to realize a current balance among converters when the switching frequencies of all the converters are the same, which indeed possesses the non-obviousness and the novelty.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A controlling method for a parallel-connected resonant converter circuit, wherein the circuit comprises a plurality of resonant converters, each of which has two input terminals and two output terminals, all the two input terminals of the plurality of resonant converters are electrically series-connected, and all the two output terminals of the plurality of resonant converters are electrically parallel-connected, comprising steps of:
   (a) causing an input current flowing through the two input terminals of a specific one of the plurality of resonant converters to rise when an output current flowing through the two output terminals of the specific resonant converter rises;
   (b) causing an input voltage across the two input terminals of the specific resonant converter to decrease when the input current flowing through the two input terminals of the specific resonant converter rises;
   (c) causing an input voltage across the two input terminals of at least one of the remaining ones of the plurality of resonant converters to rise when the input voltage across the two input terminals of the specific resonant converter decreases;
   (d) causing an output current flowing through the two output terminals of at least one of the remaining resonant converter to rise when the input voltage across the two input terminals of at least one of the remaining resonant converter rises; and (e) reaching the balance between the specific resonant converter and at least one of the remaining of resonant converters when a ratio between the output current flowing through the two output terminals of the specific resonant converter and the output current flowing through the at least one of the remaining resonant converters equals to a ratio between a reciprocal of a DC voltage gain of the specific resonant converter and a reciprocal of a DC voltage gain of the at least one of the remaining resonant converter.

2. The method according to claim 1, wherein the plurality of resonant converters comprise first and second resonant converters, the specific resonant converter is the first resonant converter and the remaining one is the second resonant converter.

3. The method according to claim 1, wherein the plurality of resonant converters are operating under an interleaved mode.

4. The method according to claim 1, wherein the plurality of resonant converters are operating at substantially the same frequency.

5. The method according to claim 2, wherein the first and second resonant converters operate with a 90° phase shift.

6. The method according to claim 1, wherein the parallel-connected resonant converter circuit further comprises:

a DC power source having positive and negative terminals;
an output capacitor; and
a plurality of input capacitors, wherein each of the plurality of input capacitors has first and second terminals and is electrically parallel-connected to the two input terminals of the corresponding one of the plurality of resonant converters, the output capacitor is electrically parallel-connected to the two output terminals of the corresponding one of the plurality of resonant converters, and the series-connected resonant converters are connected in parallel with the DC power source at the positive and negative terminals.

7. The method according to claim 1, wherein the plurality of resonant converters includes a series of resonant DC/DC converter and a parallel resonant DC/DC converter.

8. The method according to claim 6, wherein the series resonant DC/DC converter is an LLC series resonant DC/DC converter.

9. The method according to claim 6, wherein the parallel resonant DC/DC converter is an LLC parallel resonant DC/DC converter.

* * * * *